United States Patent [19]

Takaoka

[11] Patent Number: 5,247,370
[45] Date of Patent: Sep. 21, 1993

[54] FACSIMILE APPARATUS THAT CAN IDENTIFY INFORMATION SENT FROM SPECIFIC OTHER PARTY

[75] Inventor: Tatsuo Takaoka, Isehara, Japan
[73] Assignee: Ricoh Company, Ltd., Tokyo, Japan
[21] Appl. No.: 631,987
[22] Filed: Dec. 21, 1990
[30] Foreign Application Priority Data
Dec. 25, 1989 [JP] Japan ................. 1-337803
[51] Int. Cl.⁵ ............................................. H04N 1/00
[52] U.S. Cl. ........................... 358/440; 358/434; 358/296; 358/497
[58] Field of Search ............ 358/407, 402, 403, 434, 358/438, 440, 498

[56] References Cited

U.S. PATENT DOCUMENTS

| | | | |
|---|---|---|---|
| 4,532,554 | 7/1985 | Skala | 358/434 |
| 4,607,289 | 8/1986 | Kurokawa | 358/402 |
| 4,855,839 | 8/1989 | Saito | 358/434 |
| 4,876,609 | 10/1989 | Ogura | 358/434 |
| 4,918,723 | 4/1990 | Iggulden et al. | 358/402 |

Primary Examiner—Edward L. Coles, Sr.
Assistant Examiner—Fan Lee
Attorney, Agent, or Firm—Oblon, Spivak, McClelland, Maier & Neustadt

[57] ABSTRACT

A facsimile apparatus includes, a data receiving unit for receiving data from a line; a first cassette for feeding a first recording sheet; a second cassette for feeding a second recording sheet that is visually different from the first recording sheet; a recording unit for recording data received by the data receiving unit onto one of the first recording sheet and the second recording sheet; a judging unit for judging whether or not data received by the data receiving means has been sent from a specific other party; a first control unit for supplying the second recording sheets fed from the second cassette to the recording means when it is judged that the received data is data sent from the specific other party; and second control means for supply the first recording sheets fed from the first cassette to the recording unit when it is judged that the received data is not data sent from the specific other party.

10 Claims, 6 Drawing Sheets

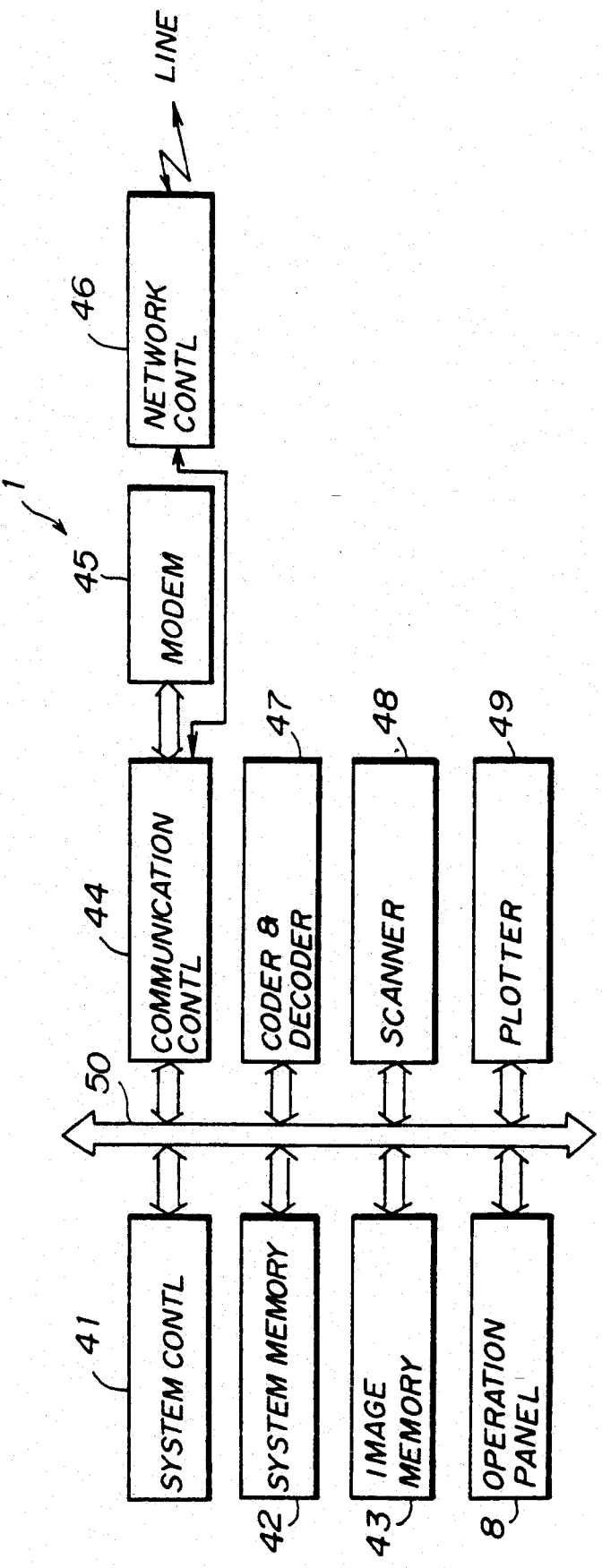

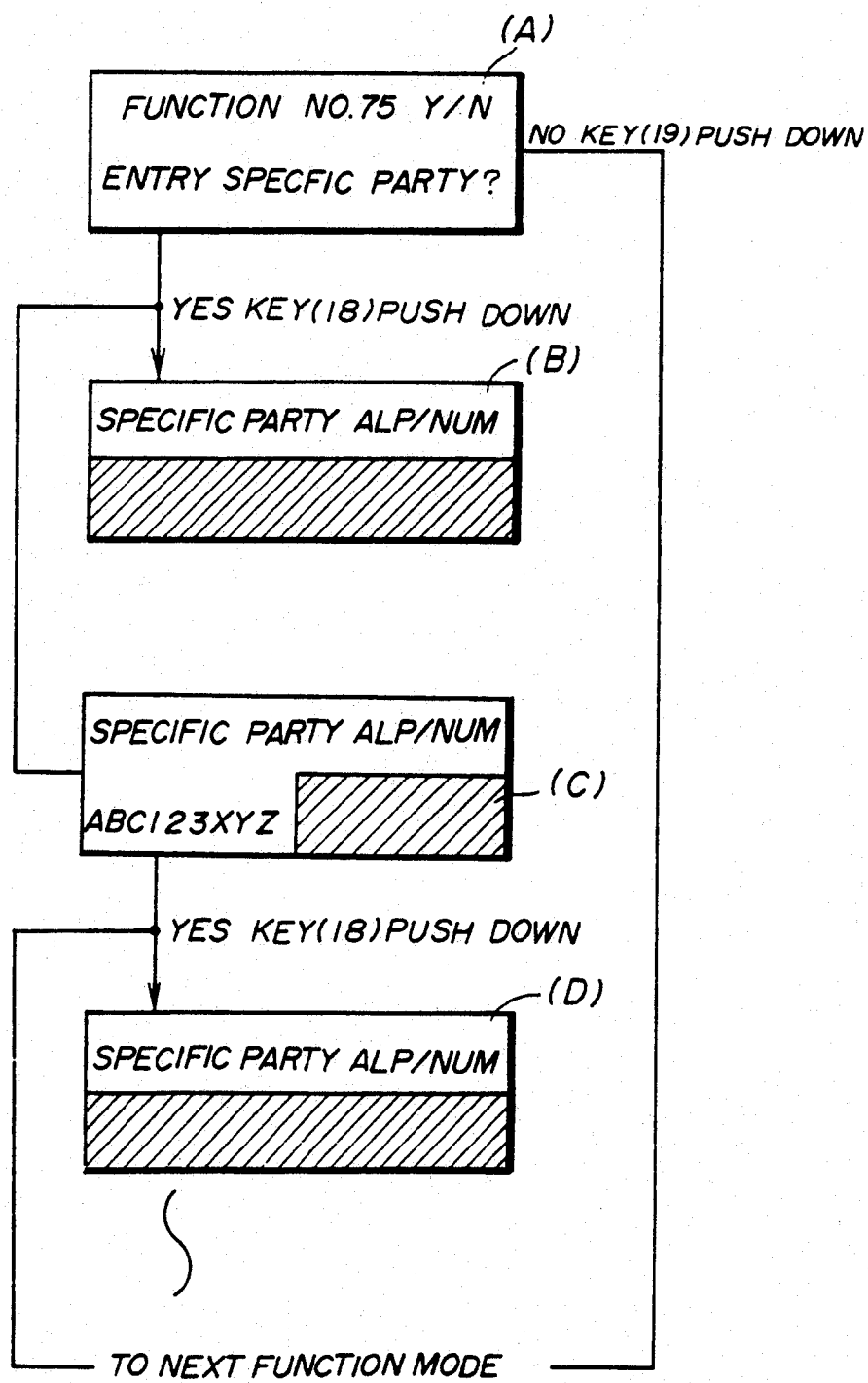

FACSIMILE APPARATUS THAT CAN IDENTIFY INFORMATION SENT FROM SPECIFIC OTHER PARTY

BACKGROUND OF THE INVENTION

This invention relates to a facsimile apparatus that can identify information sent from a specific other party, and in particular, relates to a facsimile apparatus for which an operator can easily identify a recording sheet on which facsimile data from a specific other party has been recorded.

Conventionally, when a facsimile apparatus has been used to perform facsimile communications, other party information such as the name and the like and which are sent from the facsimile apparatus of the other party, are displayed on an LCD (liquid crystal display) on the facsimile apparatus as other party information. It is possible to identify the other part of the facsimile data when the head page of the recording sheet on which the receive facsimile data is recorded, and when the other party information is recorded on the transmission cover sheet. Thus, either confirmation of the LCD on the facsimile apparatus, or the information recorded on the recording sheets has been used for conventional facsimile apparatus so that the operator can assort the recording parties for each other party.

Accordingly, when a conventional facsimile apparatus is used to perform automatic receive, it is often difficult for the operator to visually confirm the other party information displayed on the LCD since a facsimile apparatus does not always have an operator present. In addition, even if a transmission cover sheet on which information to identify the other party is sent, there is the possibility that the discharge tray may contain recording sheets from a plural number of other parties, and therefore make it difficult to visually confirm the recording sheet o which information from a specific other party has been recorded, from amongst the plurality of recording sheets.

SUMMARY OF THE INVENTION

Accordingly, a general object of the present invention is to provide a facsimile apparatus in which the disadvantages of the aforementioned prior art are eliminated.

A more specific object of the present invention is to provide a facsimile apparatus in which it is easy for a user to identify recording sheets on which facsimile data from a specific other party has been recorded.

The above objects of the present invention are achieved by a facsimile apparatus comprising data receiving means for receiving data from a line; first recording sheet supply means for feeding a first recording sheet; second recording sheet supply means for feeding a second recording sheet that is visually different from the first recording sheet; recording means for recording data received by the data receiving means onto one of the first recording sheet and the second recording sheet; judging means for judging whether or not data received by the data receiving means has been sent from a specific other party; first sheet supply control means for supplying the second recording sheets fed from the second recording sheet supply means to the recording means when it is judged that the received data is data sent from the specific other party; and second sheet supply control means for supplying the first recording sheets fed from the first recording sheet supply means to the recording means when it is judged that the received data is not data sent from the specific other party.

The above objects of the present invention are also achieved by a facsimile apparatus comprising data receiving means for receiving data from a line; recording sheet feed means having a plurality of types of recording sheets and for selectively feeding a recording sheet from the plurality of recording sheets wherein each type of recording sheet corresponds to one or a plurality of other parties; recording means for recording data received by the data receiving means onto a recording sheet fed from said recording sheet feed means; judging means for judging a type of recording sheet corresponding to the other party which is sending data; and recording sheet supply control means for supplying a recording sheet of one type judged by the judging means, from the recording sheet feed means to the recording means.

Additional objects, features and advantages of the present invention will become apparent from the following detailed description when read in conjunction with the accompanying drawings.

BRIEF DESCRIPTION OF THE DRAWINGS

In order to achieve the objectives of the present invention, the characteristics and effects thereof will become clear through the detailed description hereinafter, with reference to the appended drawings, wherein:

FIG. 3 is a block diagram showing the configuration of a control system of a facsimile apparatus of a first embodiment according to the present invention;

FIG. 5 is a view showing a message displayed to correspond to operation procedures for registration of specific other party information in a facsimile apparatus of a first embodiment according to the present invention;

DESCRIPTION OF THE PREFERRED EMBODIMENTS

Figure 1:
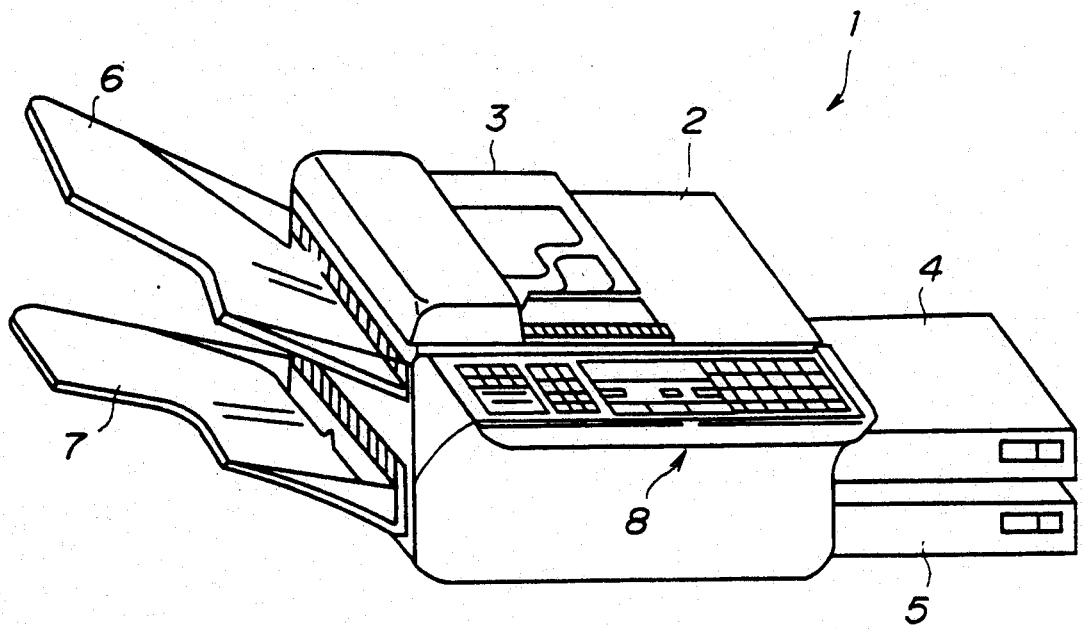
FIG. 1 is an external view of a facsimile apparatus of a first embodiment according to the present invention.

FIG. 1 is an external view of a facsimile apparatus of a first embodiment according to the present invention. The description will commence from the configuration of a facsimile apparatus of a first embodiment according to the present invention. A facsimile apparatus 1 is provided with an original feed table 3, recording sheet cassettes 4,5, and original tray 6, a discharge tray 7 and an operation and display panel 8, provided to a main unit 2.

The original feed table 3 is a table for setting the originals that are to be sent. It is possible to set either one original or a plural number of originals on the original feed table 3. The recording sheet cassettes 4,5 house a plural number of recording sheets so that the facsimile can record the received facsimile data and are set in the main unit 2. These recording sheet cassette 4 and 5 can have recording sheets of different types set inside them. In the present embodiment, white recording sheets which are normally used are set in the recording sheet cassette 4 and recording sheets of a yellow color for purposes of identification are set in the recording sheet cassette 5. The yellow-colored sheets for purposes of identification and which are set in the recording sheet cassette 5 are used to record data that has been sent from a facsimile apparatus of a specified other party. The originals that have been read in the main unit 2 are stacked in the original tray 6. Recording operation is performed by the main unit 2 and the recording sheet that is discharged from the main unit 2 is stacked in the discharge tray 7.

Figure 2:
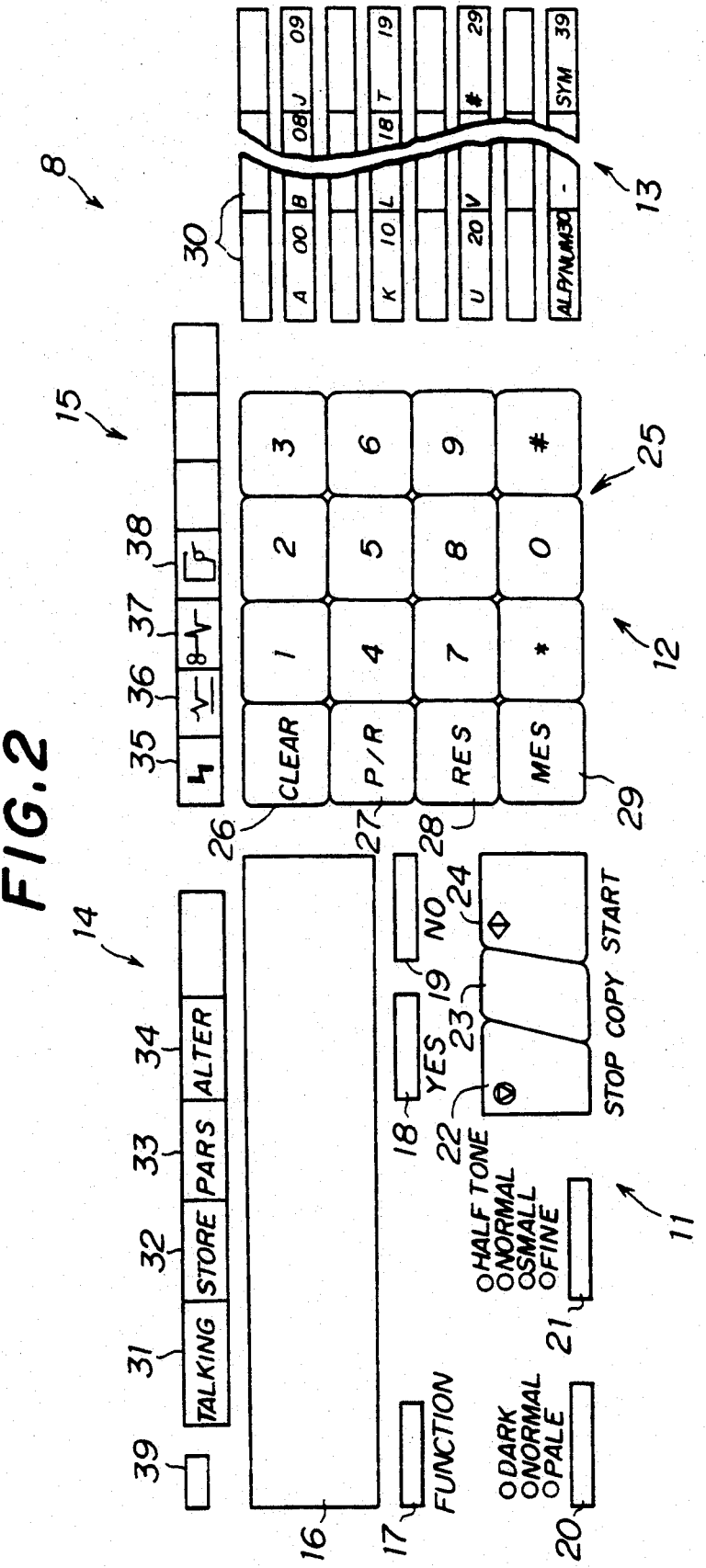
FIG. 2 is a view showing the configuration of an operation and display portion of a facsimile apparatus of a first embodiment according to the present invention.

The operation and display panel 8 is provided on the main unit 2 and displays information which indicates various types of processing, and messages with respect to the operator. FIG. 2 shows the configuration and operation of the display panel 8. The key configuration portion of the operation and display panel 8 is configured from the following key groups. The processing specification key group 11 has keys to specify various types of processing. The numerical key group 12 has keys in order to execute the various types of processing and to input numerical values relating to the data. The automatic key dialing group 13 has one-touch keys that execute registration and read data corresponding to the facsimile machine (telephone) number of another party by only a single key operation. Each of the keys in the automatic key dialling group 13 is termed an automatic key.

In addition, the display configuration portion of the operation and display panel 8 is configured from the following display portions. Each of the LED of the operation display LED group 14 indicates an operation mode of the facsimile apparatus 1. Each of the LED of the error indication LED group 15 indicate the location of the error, and the LCD (liquid crystal display) displays various types of messages with respect to the operator. The processing specification group 11 is provided with a function key 17, a YES key 18, a NO key 19, a density selector key 20, a line density selector key 21, a STOP key 22, a COPY key 23 and a start key 24. The number key group 12 is provided with a numerical value key portion 25 configured from the ten keys of 0 to 9, a CLEAR key 26, a pause/redial key 27, a call reservation key 28 and a memory send key 29. The automatic key dialling group 13 is provided with a label 30 so that the name of the other party destination can be written so as to correspond with the other party names that have been registered. The LED group 14 is provided with an LED 31 that indicates that there is normal facsimile communications, an LED 32 that indicates that there is information stored in the memory, an LED 33 that indicates that there is 'confidential' receive, and an LED 34 that indicates that there is 'proxy' receive. Data that is received in the 'confidential' receive mode is stored in the memory and is read from the memory and output only after the input of a secret code. Accordingly, it is necessary to input the secret code when this LED 33 is lit. In addition, when there is 'proxy' receive and receive and the recording sheet runs out, or when the recording sheet has been misfed or when there is no toner or he like, the facsimile data which that has been automatically received is stored in the memory and can be output from the memory when there has been recovery from a state such as those which have been described above.

The error indicator LED group 15 is provided with a send error LED 35, an original jam LED 36, a recording sheet jam LED 37 and a door open LED 38. The power on LED 39 indicates the status where the power is on.

FIG. 3 is a block diagram showing a configuration of the control system of the facsimile apparatus 1. The facsimile apparatus 1 is provided with a system control portion 41, a system memory 42, an image memory 43, an operation and display panel 8, a communications control portion 44, a modem 45, a network control portion 46, coder/decoder portion 47, a scanner 48 and a plotter 49, each of which is connected to a bus 50. The system control portion 41 executes an operating sequence of a facsimile apparatus in accordance with a program stored in the system memory 42. The system control portion 41 performs processing to compare the other party data of a specific other party table 52 with an other party information storage area 51, performs identification processing in order to identify whether or not the data are in agreement and then select the recording sheet cassette 4 or 5 on the basis of the results of this identification.

Figure 4:
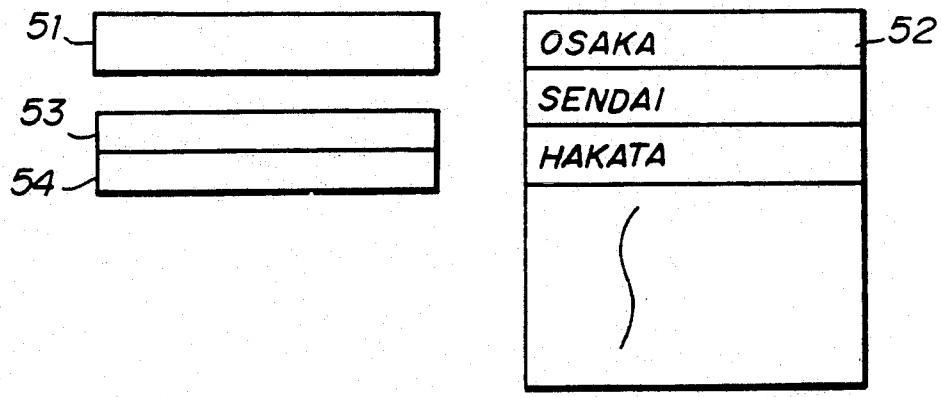
FIG. 4 is a view showing the internal configuration of a system memory of a facsimile apparatus of a first embodiment according to the present invention.

The system memory 42 has a storage area to store a program for the execution of the sequence in the facsimile apparatus 1, and a storage area that stores a program for the execution of selection processing for the recording sheet cassettes 4,5, and the identification processing for the other party information. As shown in FIG. 4, this system memory 42 has an other party information storage area 51 in which the other party information is stored, and a specific other party table 52 that stores the other party information of a specific other party.

The data of the other party information storage area 51 is renewed each time there is the execution of facsimile communications. In addition, the data of the specific other party table 52 can be registered, changed and referred to by operation from the operation and display panel 8. The image memory 43 is configured from a large-capacity memory such as a hard disk or an optical disk or the like, or a DRAM (dynamic RAM) or CMOS (complementary metal-oxide semiconductor), and stores the coded image information. The communications control portion 44 performs communications control for the receive signals and the send signals via the communications circuit and according to the facsimile control sequence. The modem 45 performs modulation and demodulation of the image signals when there is facsimile send and facsimile receive. The network control portion 46 is connected to the circuit and executes the communications sequences necessary for communications with the terminal of the other party when there is send and receive. The coder/decoder portion 47 codes the sent image signals by a required coding method and also decodes the received image signals. A raster scanner generally using a CCD (charge couple device) is used as the scanner 48. The scanner 48 reads one line at a time of the original for sending and which has been set in the original feed table 3 and sent to inside the main unit 2, and outputs the image data to the other party destination. The plotter 49 is for example a thermal recording apparatus that uses a thermal element. The recording sheets are set in the recording sheet cassettes 4,5 and sent to inside the main unit 2 and the plotter 49 either directly records onto thermally sensitive recording sheet, or indirectly records onto plain recording sheet using an ink jet.

The following is a description of the operation for recording specific other party information into the specific other party table 52. This processing is performed by using the operation and display panel 8. These operation procedures and the messages displayed on the LCD 16 are are described with reference to FIG. 5.

One premise of performing this processing is that the facsimile apparatus 1 must be in the standby status. When the operator initially presses the function key 17 of the operation and display panel 8, the facsimile apparatus 1 enters the function mode. For example, the registration function for specific other parties is assigned the function key number "75." The operator uses the numerical value key portion 25 to input the function key number "75." When the function key "75" is input, then as shown in FIG. 5A, a message is displayed on the LCD 16 inquiring whether specific other party registration is to be performed. When the operator confirms this message and presses the YES key 18, the display of the LCD 16 changes to the specific other party data registration screen shown in FIG. 5 (B) and (D). The operator then confirms that this registration screen is displayed and then registers the specific other party data.

The data relating to the specific other party is registered by operating the automatic key dialling group 13 and the numerical value key portion 25. For example, the key operation is as follows when the data relating to the other party is "ABC123XYZ".

(a) Key operation of the automatic key dialling group 13 is used to input "00,01,03" and "ABC" is displayed on the screen of the LCD 16 as shown in FIG. 5.

(b) The numerical value key portion 25 is used to input "1,2,3" so that "ABC123" is displayed on the screen on the LCD 16 shown in FIG. 5.

(c) The automatic key dialling group 13 is used to input "23,24,25" so that "ABC123XYZ" is displayed on the LCD 16 shown in FIG. 5. The position for the input of the characters in the example described above is indicated by the cursor on the LCD 16.

After the data has been input, the YES key 18 is pressed and the specific other party data that has been input is stored in the specific other party table 52 in the system memory 42. When this is done, if there is an unregistered region in the specific other party table 52, the LCD 16 of the operation and display panel 8 changes to the full data input request screen shown in FIG. 5 (D), and the procedure shifts to the next function mode No.76 if the entire region of the specific other party table 52 has been registered.

Also, if the operator does not register any data when there is switching to the registration screen of FIG. 5 (A), there is switch to the full data registration screen shown in FIG. 5 (B). In addition, if the other party registration for more than one party has been made, and the YES key 18 is pressed for the screen shown in FIG. 5 (C), then it is possible to search for a data portion that has already been registered.

In FIG. 5 (A), pressing the NO key 19 shifts the screen to the next function mode No.76 and pressing the function key 17 once again returns to the standby mode.

Also, the key operation to erase registered data is performed as follows, for the example of when "ABC123XYZ" is to be erased.

(a) When the operator presses the keys "39" of the automatic key dialling group 13, the following symbols are successively displayed at the cursor position of the LCD 16.

" "→"."→" "→" " through to " "

(b) Next, the operator moves the cursor position so that it comes to the head of the data that is displayed.

(c) Then, the operator presses "39" of the automatic key dialling group 13 and selects " ";

(d) The operator then presses the YES key 18 and registers dummy data. More specifically, the data " ABC123XYZ" is registered. After this, the head data is judged to be "none" and that data is cleared before registration in the specific other party table 52.

This erase operation erases data from inside the specific other party table 52.

Figure 6:
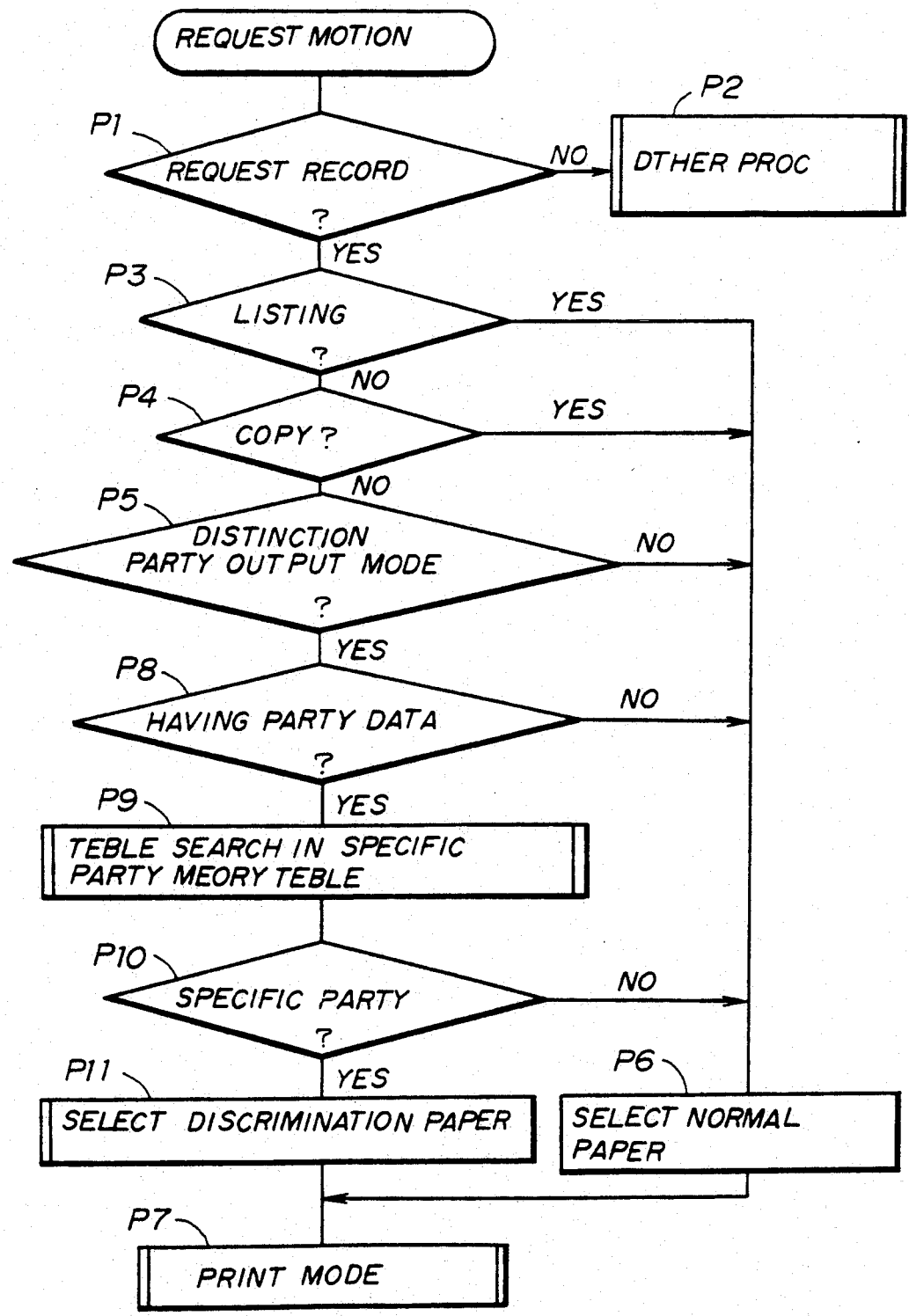
FIG. 6 is a flow chart showing the program for the selection of a recording sheet cassette set in the facsimile apparatus of a first embodiment according to the present invention.

The following is a description of the selection processing for the recording sheet cassettes 4,5 for the case where facsimile data is received by the facsimile apparatus 1 after the registration of the specific other party data has been completed as described above. FIG. 6 is a flow chart that indicates the selection processing. A premise to the performance of this selection processing is that the other party information must have been registered in the specific other party table 52 by the operator from the operation and display panel 8.

The facsimile apparatus 1 is in the sending/receive stand-by status and it is judged whether or not the operator operates the operation and display panel 8. In addition, the facsimile apparatus 1 analyzes the contents of the operation request corresponding to the signals that are input from the circuit. First, when the operation signal is input, the facsimile apparatus 1 judges whether or not it is necessary to record the input receive signals onto a recording sheet (step P1). The method for this judgment involves a search of the recording sheet selection mode area 53 inside the system memory shown in FIG. 4. When this is done, and the recording sheet selection mode area 53 is in the ON status, the other party information is recorded onto the recording sheet for identification. The information in this recording sheet selection mode area 53 is stored in the system memory and is judged by the system control portion.

If the judgment results in step P1 is NO, then other processing is performed (step P2). On the other hand, if the result of judgment is for a list request (step P3), then the plain recording sheet cassette is selected (step P6). If the result is something other than a list request, then a copy request is judged (step P4) and the plain recording sheet cassette is selected (step P6).

When list output is performed by this (step P3), the system control portion 41 selects the plain recording sheet cassette 4 that houses the plain recording sheet (step P6). Furthermore, the system control portion 41 shifts the mode to the print mode, and the plotter 49 records the received facsimile data on the plain white recording sheet supplied from the plain recording sheet cassette 4 (step P7). In addition, when there is copy output (step P4), the system control portion 41 selects the plain recording sheet cassette 4 which is the upper cassette in which plain recording sheet has been set (step P6). In this case as well, the system control portion 41 also shifts the mode to the print mode and the plotter records by the copy mode (step P7) onto plain recording sheet. Accordingly, when it is judged that there is list output and copy output, the system control portion 41 selects the cassette in which plain white recording sheets have been set, and performs the output.

On the other hand, when there is not to be mode list output or copy output, the system control portion 41 checks that the information held in the system memory 42 is the other party separate output mode (step P5). If the mode is not set to the other party separate output mode, the system control portion 41 selects the plain recording sheet cassette 4 (step P6). Furthermore, the system control portion 41 shifts to the print mode and the facsimile data received by the plotter 49 is recorded a plain recording sheet (step P7) When there is not a list request or a copy request, a check is made for whether the other party separate output mode has been set or not (step P5), and the plain recording sheet cassette 4 is selected if it has not been set (step P6) there is shift to the print mode, and the received data is recorded onto the plain white recording sheet (step P7). If the facsimile data has other party information then first of all, the system control portion 41 performs control so that the other party information is stored in the transmission other party data storage area 51 and the table of the specific other party data stored in the specific other party table 52 of the system memory 42 is searched (step P9). If the received other party data and the registered other party data are in agreement (step P10) then the system control portion 41 selects the recording sheet cassette 5 that houses the yellow recording sheets (step P11). Then, the system control portion 41 shifts the mode to the print mode, and the plotter 49 records the facsimile data on the yellow recording sheet of the recording sheet cassette 5 (step P7).

When recording sheet is output from the facsimile apparatus 1, this processing described above causes yellow recording sheet output from the identification recording sheet cassette 5 to be mixed in with the plain recording sheet output from the plain recording sheet cassette 4. Therefore, when only the recording sheet on which facsimile data of a specific other party is yellow, the operator can quickly see the recording sheet of that specific other party by simply looking at the discharge sheet tray 7. Accordingly, it is possible for there to be a considerable reduction in the time involved to collate the recording sheets.

In addition, when the recording sheet in either of the plain recording sheet cassette 4 or the identification recording sheet cassette 5 runs out while copying is in progress, the facsimile apparatus 1 displays a message for recording sheet supply on the LCD of the operation and display panel 8. Then, the usage mode is switched to the proxy receive mode until a recording sheet is supplied to the recording sheet cassette for which the recording sheets ran out, and recording sheet is output to the discharge tray 7 after both recording sheet cassettes have been set in the main unit 2 of the facsimile apparatus 1. Accordingly, it is possible for the operator to accurately identify between receive from a regular other party and receive from a specific other party.

Moreover, in the case of the receiving of confidential communications, after the completion of the judgment as to whether or not there is a specific other party in step P10 of FIG. 6, a judgment is performed for whether or not there is proxy receive or confidential receive and in accordance with necessity, the cassette selection processing and print mode processing are skipped. Then, when the contents of the confidential receive are output, the steps P1 through P10 of FIG. 6 are executed and processing for cassette selection and print mode processing is performed when this is done. Moreover, one of the items of processing for the other party identification processing is the registration of the other party information in the specific other party table 52 when there is a plurality of items of information, and the following is a description of when recording sheet of another color has been added in order to assist identification.

When the recording sheet that has been added is the color green, a recording sheet color identification parameter is added to the specific other party table 52. For example, if the parameter for the color of the recording sheet is green; G, yellow; Y then the table is created as follows so as to correspond to each other party.

| Color | Other Party |
| --- | --- |
| G | OSAKA |
| Y | SENDAI |
| G | HAKATA |
| . . . | . . . |

Figure 7:
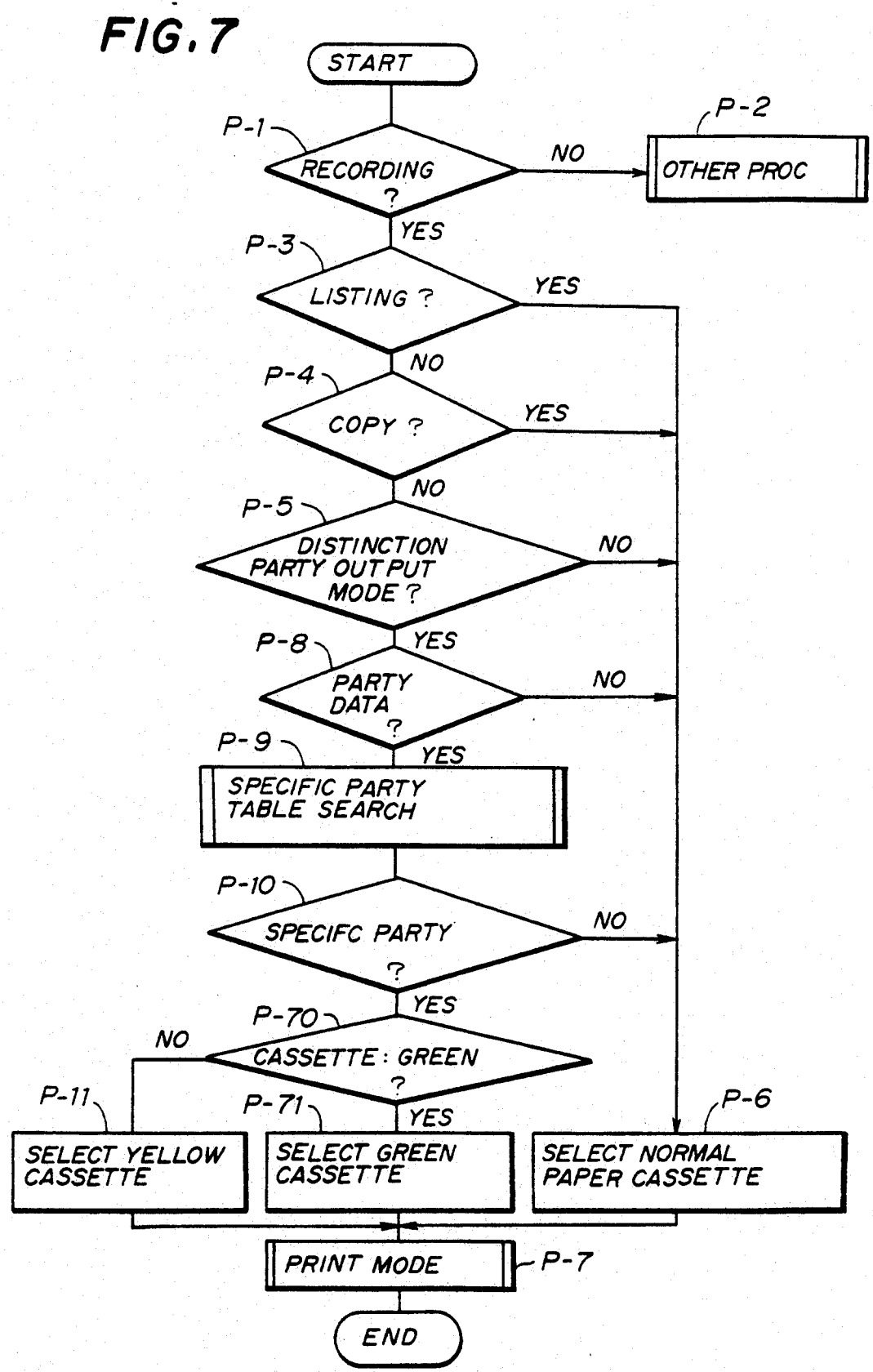
FIG. 7 is a flow chart showing the program for the selection of a recording sheet cassette when a recording sheet cassette has been additionally set to a facsimile apparatus of a second embodiment according to the present invention.

FIG. 7 shows a flow chart for the case when an identification cassette has been added. The portion of the processing that is the same as that of FIG. 6 has the same step numbers added. A search of the other party table is made in step P70 and if the parameter for the recording sheet is "G", then the cassette housing the green recording sheet is selected (step P71) and if the parameter for the recording sheet is "Y", then the cassette housing the yellow recording sheet is selected (step P11).

In the embodiment described above, the color of the recording sheets of the identification recording sheet cassette was yellow but of course any color can be used instead in order to discriminate it from plain recording sheet. In addition, it is of course possible to not use recording sheet of a different color, but recording sheet that has a different shape or texture that discriminates it from the other recording sheet.

The present invention is not limited to the aforementioned embodiments, and variations and modifications may be made without departing from the scope of the claimed invention.

What is claimed is:

1. A facsimile apparatus comprising:
   data receiving means for receiving data from a line;
   first recording sheet supply means for feeding a first recording sheet;
   second recording sheet supply means for feeding a second recording sheet that is visually different from said first recording sheet;
   recording means for recording data received by said data receiving means onto one of said first recording sheet and said second recording sheet;
   judging means for judging whether or not data received by said data receiving means has been sent from a specific other party;
   first sheet supplying control means for supplying said second recording sheets fed from said second recording sheet supply means to said recording means when it is judged that said received data is data sent from said specific other party; and
   second sheet supply control means for supply said first recording sheets fed from said first recording sheet supply means to said recording means when it is judged that said received data is not data sent from said specific other party.

2. A facsimile apparatus as claimed in claim 1, wherein said judgment means has a storage means for storing other party information to specify said specific other party, and a comparison means for judging whether or not sending party information specifying a sending party included in said received data is in agreement with other party information stored in said storage means.

3. A facsimile apparatus as claimed in claim 2, wherein said storage means comprises a random access memory, and said facsimile apparatus has a write means for writing other party information to said memory.

4. A facsimile apparatus as claimed in claim 3, wherein said write means has input means for inputting other party information, other party information input from said input means by a user being written to said memory.

5. A facsimile apparatus as claimed in claim 4, wherein said input means has a plural number of operation keys which are operated by the user to input other party information.

6. A facsimile apparatus as claimed in claim 1, wherein said second recording sheet has a color that is different from said first recording sheet.

7. A facsimile apparatus as claimed in claim 1, wherein said second recording sheet has a shape that is different from said first recording sheet.

8. A facsimile apparatus as claimed in claim 1, wherein said second recording sheet has a size that is different from said first recording sheet.

9. A facsimile apparatus as claimed in claim 1, wherein said first recording sheet feed means has a first recording sheet cassette housing a plurality of first recording sheets and being detachable from said facsimile apparatus, and wherein the first recording sheets are fed one by one from said first recording sheet cassette.

10. A facsimile apparatus as claimed in claim 1, wherein said second recording sheet feed means has a second recording sheet cassette housing a plurality of second recording sheets and being detachable from said facsimile apparatus, and wherein the second recording sheets are fed one by one from said second recording sheet cassette.

* * * * *